US00RE41025E

(19) United States
(12) Reissued Patent
Stirling-Gallacher et al.

(10) Patent Number: US RE41,025 E
(45) Date of Reissued Patent: Dec. 1, 2009

(54) TRANSMITTER AND TRANSMITTING METHOD INCREASING THE FLEXIBILITY OF CODE ASSIGNMENT

(75) Inventors: Richard Stirling-Gallacher, Stuttgart (DE); Jens-Uwe Jurgensen, Fellbach (DE)

(73) Assignee: Sony Deutschland GmbH, Cologne (DE)

(21) Appl. No.: 11/139,004

(22) Filed: May 26, 2005

Related U.S. Patent Documents

Reissue of:
(64) Patent No.: 6,570,889
Issued: May 27, 2003
Appl. No.: 09/270,601
Filed: Mar. 17, 1999

(30) Foreign Application Priority Data

May 15, 1998 (EP) ..... 98108906

(51) Int. Cl.
*H04J 13/00* (2006.01)

(52) U.S. Cl. ..... 370/479; 370/208; 375/146; 455/450

(58) Field of Classification Search ..... 370/464, 370/479, 465, 431, 480, 435, 441, 442, 208, 370/203, 343, 335, 209, 474
See application file for complete search history.

(56) References Cited

U.S. PATENT DOCUMENTS 5,309,474 A * 5/1994 Gilhousen et al. ..... 370/209
5,341,397 A * 8/1994 Gudmundson ..... 370/335
5,550,809 A * 8/1996 Bottomley et al. ..... 370/209
5,715,236 A * 2/1998 Gilhousen et al. ..... 370/209
5,742,678 A * 4/1998 Dent et al. ..... 380/270
5,757,767 A * 5/1998 Zehavi ..... 370/208
5,771,288 A * 6/1998 Dent et al. ..... 380/270
5,905,962 A * 5/1999 Richardson ..... 455/522
6,009,091 A * 12/1999 Stewart ..... 370/342
6,072,778 A * 6/2000 Labedz et al. ..... 370/252
6,108,369 A * 8/2000 Ovesjo et al. ..... 375/146
6,163,524 A * 12/2000 Magnusson ..... 370/208
6,198,719 B1 * 3/2001 Faruque ..... 370/209
6,233,231 B1 * 5/2001 Felix ..... 370/335
6,339,646 B1 * 1/2002 Dahlman ..... 380/273
2001/0019576 A1 * 9/2001 Nystrom et al. ..... 375/136

FOREIGN PATENT DOCUMENTS

WO WO 96 05668 A * 2/1996

OTHER PUBLICATIONS

Technical Report (TR) 101 146, V3.0.0 (Dec. 1997), Universal Mobile Telecommunications System (UMTS); UMTS Terrestrial Radio Access (UTRA); Concept Evaluation (UMTS 30.06 version 3.0.0).

* cited by examiner

*Primary Examiner*—Wing F Chan
*Assistant Examiner*—Brian Roberts
(74) *Attorney, Agent, or Firm*—Frommer Lawrence & Haug LLP; William S. Frommer; Thomas F. Presson

(57) ABSTRACT

[According to the present invention a] *A* transmitter and a transmitting method for communicating data symbols over a communication channel[, for example, according to the CDMA system is presented]. [The transmitter (24, 25) comprises means (9) for spreading] *A spreading section spreads* each data symbol with a respective spreading code[, wherein the]. *The* spreading codes are mutually orthogonal. [Means (10) for scrambling are] *A scrambling section is* provided to scramble each spread symbol with a respective scrambling code[, the scrambling codes respectively having the same length as the spreading codes]. Furthermore, [means (11) for] *a transmission section for* the transmission of the spread and scrambled symbols [are provided] *is provided*. According to the present invention [the means (10) for scrambling are] *the scrambling section is* provided with a plurality of different scrambling codes, which can be used simultaneously within the same link.

22 Claims, 5 Drawing Sheets

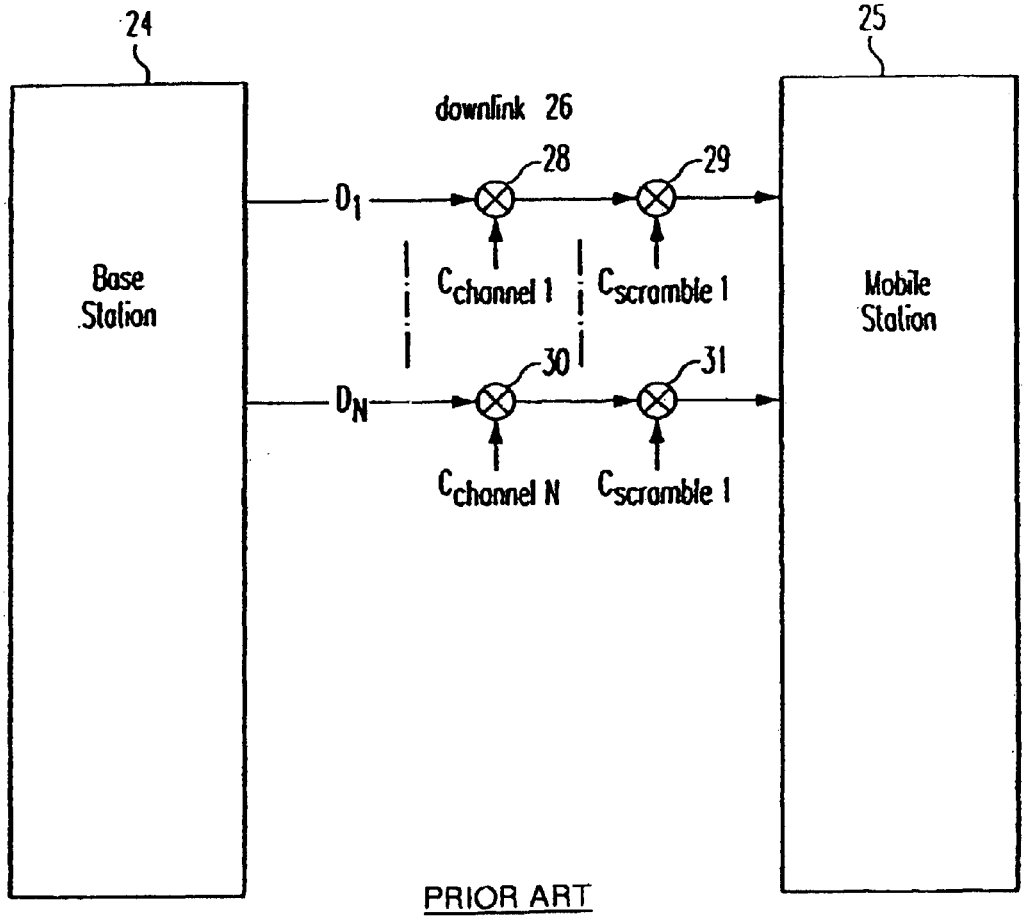
Fig. 3 (Amended)

TRANSMITTER AND TRANSMITTING METHOD INCREASING THE FLEXIBILITY OF CODE ASSIGNMENT

Matter enclosed in heavy brackets [ ] appears in the original patent but forms no part of this reissue specification; matter printed in italics indicates the additions made by reissue.

The present invention relates to a transmitter, a wireless transmission system as well as to a method for the transmission of data symbols over a communication channel which particularly finds its application in the field of so-called CDMA systems.

CDMA (Code Division Multiple Access) transmitting systems are known from the state of the art. According to one CDMA technique, after the modulation (symbol mapping), the symbols are spread by a so-called spreading sequence or spreading code. After spreading the resulting data stream is scrambled by a scrambling sequence of a scrambling code. The thus resulting data stream, which has been spread and scrambled, is then power-amplified and sent over a communication channel. The reverse procedure happens at the receiving side.

In FIG. 3 an example for a transmission system comprising scrambling and spreading is shown. In the example of FIG. 3 only the downlink communication channel 26 from a base station 24 to a mobile station 25 is shown. The downlink 26 can comprise different channels $D_1, \ldots, D_N$. Each channel comprises channelisation (spreading) 28, 30 and scrambling 29, 31. According to the state of the art in one link, as for example the downlink 26 as shown in FIG. 3, only one scrambling sequence (scrambling code) and several different spreading codes (often referred to as channelization codes) are used depending upon the data rate and services required. The drawback of this approach is that only certain types of channelisation codes can be used together and the highest data rate is constrained by the length of the shortest channelisation code. This is especially true when codes of different rates are used.

From WO96/05668 A1 and EP-A-565 506 techniques for multiple access coding for radio communication is known. According to these documents information symbols are spread using orthogonal or bi-orthogonal codewords. This spread information symbols are assigned a unique scramble mask that is taken from a set of scramble masks having selected correlation properties. The set of scramble masks is selected such that the correlation between the modulo-2 sum of two scramble masks with any codeword is a constant magnitude independent of the codeword and the individual mask being compared. According to one embodiment of WO 96/05668 A1, when any two masks are summed using modulo-2 sum arithmetic, the Walsh transformation of that sum results in a maximally flat Walsh spectrum. For cellular radio telephone systems using subtractive CDMA demodulation techniques, a two-tier ciphering system ensures security at the cellular system level by using a pseudorandomly generated code key to select one of the scramble masks common to all of the mobile stations in a particular cell. As according to these techniques one common scramble mask is used for all mobile stations in a particular cell, the above-cited drawback arises that only certain types of channelisation codes can be used together limiting the number of available channelisation (spreading) codes.

In view of the above-cited drawbacks it is of the object of the present invention to enhance the flexibility of code assignment for a CDMA system, particularly within a cell sector and/or to increase the maximum data rate.

The central idea of the present invention thereby is a new code allocation scheme for a CDMA system utilising two or more scrambling codes within one link (uplink or downlink).

According to the present invention therefore a transmitter for communicating data symbols over a communication channel is provided, the transmitter comprising means for spreading each data symbol with a respective spreading code, wherein the spreading codes are mutually orthogonal. Furthermore means for scrambling each spread symbol with a respective scrambling code are provided, the scrambling codes respectively having the same length as the spreading codes. Means are provided for the transmission of the spread and scrambled symbols. According to the present invention the means for scrambling are provided with a plurality of different scrambling codes which can be used simultaneously within the same link.

The means for scrambling the spread symbols can use different scrambling codes for an uplink communication channel and a downlink communication channel.

The spreading codes can be obtained by means of a code tree.

According to an aspect of the present invention, only in a downlink communication channel different scrambling codes are used, wherein in an uplink channel only one scrambling code is used.

The means for scrambling can use different scrambling codes within the same link only for channels demanding a high bit rate.

According to the present invention, furthermore a wireless transmission system comprising a transmitter of the above-cited type is provided, wherein a subset of scrambling codes is respectively allocated to a cell of the transmission system.

Different spreading codes can be allocated to adjacent cells of the transmission system.

According to the present invention, furthermore a method for the transmission of data symbols over a communication channel is provided. Data symbols are spread with a respective spreading code, wherein the respective spreading codes are mutually orthogonal. Each spread symbol is scrambled with a respective scrambling code, the scrambling codes not changing the band rate of the transmission (in contrast to the spreading codes). The spread and scrambled symbols are transmitted.

According to the present invention, when scrambling a plurality of different scrambling codes can be used, which are to be used simultaneously within the same link.

In the step of scrambling different scrambling codes can be used for an uplink communication channel and a downlink communication channel, respectively.

The spreading codes can be obtained by means of a code tree.

As an aspect of the present invention, only in a downlink communication channel different scrambling codes are used. In the uplink communication channel only one scrambling code is used, as the bit rate usually is less than in the downlink communication channel.

Different scrambling codes can be used within the same link only for channels demanding a high bit rate.

Particularly different scrambling codes within the same link can be used for example for video channels and/or data channels, but for example not for voice channels.

Further aspects, advantages and features of the present invention will now be explained by means of embodiments of the present invention and with reference to the enclosed figures of the drawings.

FIG. 3 shows the channelisation (spreading) and scrambling in a downlink communication channel between a base station and a mobile station according to the prior art.

Figure 1:
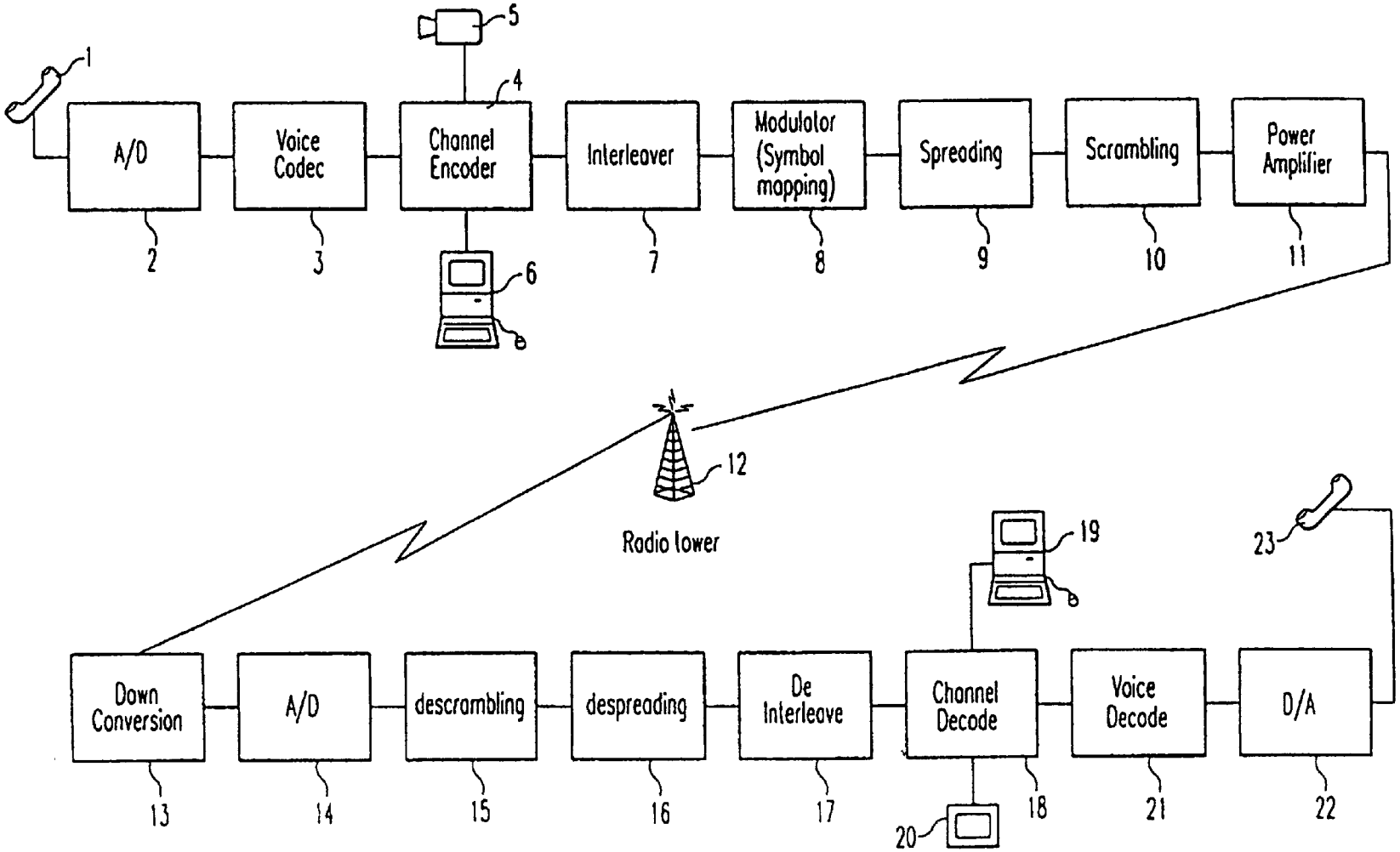
FIG. 1 shows a general view of a wireless transmission system according to the present invention.

A transmission system according to the present invention will now be explained generally with reference to FIG. 1. As shown in FIG. 1, different data can be transmitted in a wireless manner. The data to be transmitted can comprise voice data from a telephone 1, 23, video data, for example, from a video camera 5 to be transmitted to a monitor 20 and other information data, as for example, data from a computer 6 to be transmitted to another computer 19. The analog voice data from a telephone 1 are A/D-converted 2, voice coded 3 and then supplied to a channel encoder 4 included in the transmitter. The data, for example, from a video camera 5 or from the computer 6 are also supplied to the channel encoder 4. The different data, for example, the voice data and the video data can be transmitted simultaneously. The data from the channel encoder 4 are given to a interleaver 7 and then supplied to a modulator 8 providing for a symbol mapping. The modulated data from the modulator 8 are then spread 9 and scrambled 10, which will be explained later on in detail. The spread and scrambled data are amplified 11, and then transmitted over a wireless transmission path 12. It will be seen that the interleaver 7, modulator 8, spreader 9, scrambler 10, and amplifier 11 also are included in the transmitter. On the receiving side the wireless transmitted data are down converted 12, A/D converted 14, descrambled 15 and despread 16. The descrambling and the despreading will also be explained later on in detail. The descrambled and despread data are de interleaved 17 and then supplied to a channel decoder 18. The channel decoder 18 outputs data to a computer 19, to a monitor 20 and/or a voice decoder 21. In case of the voice data, the voice-decoded-data 21 are D/A converted 22 and the supplied to a handset 23.

Figure 2:
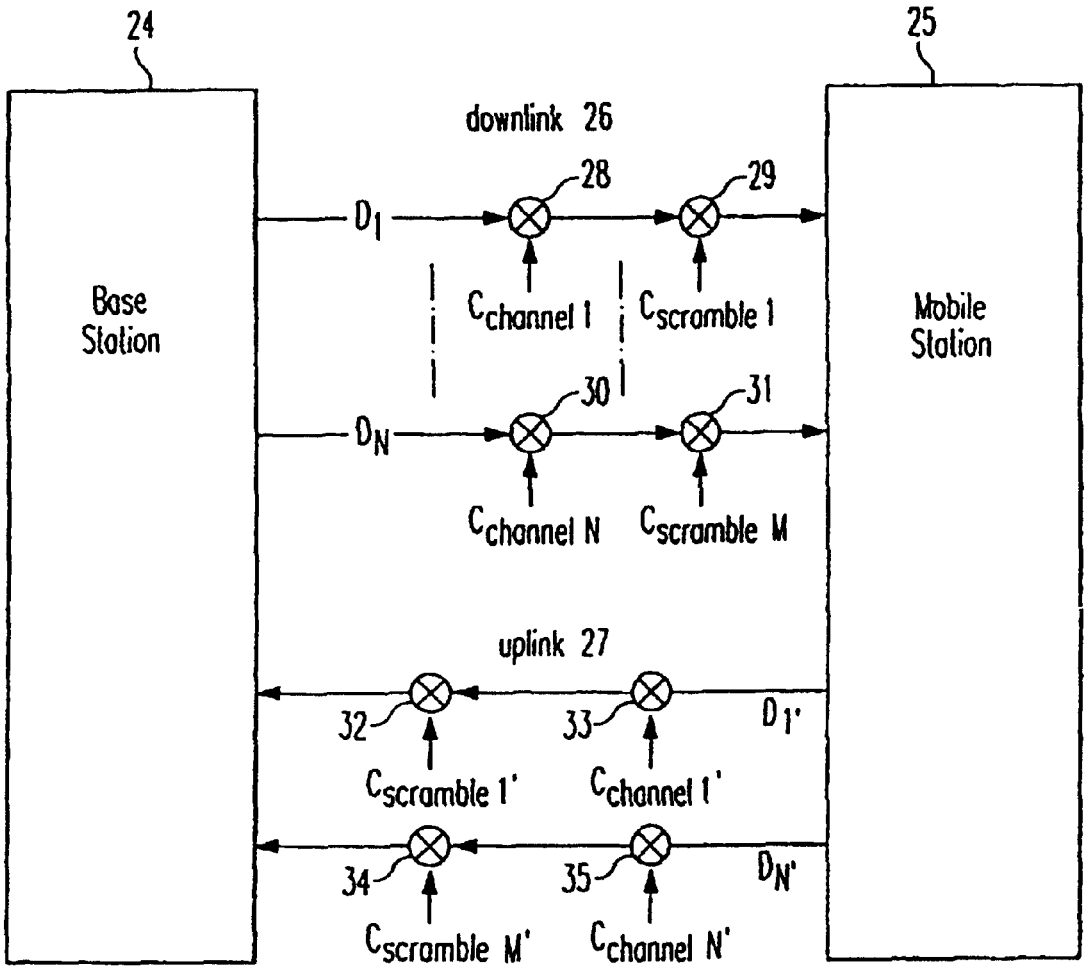
FIG. 2 shows the spreading and scrambling according to the present invention respectively for a downlink communication channel and a uplink communication channel between a base station and a mobile station of the wireless transmission station as shown in FIG. 1.

With reference to FIG. 2, particularly the scrambling procedure according to the present invention will now be explained in detail.

In FIG. 2, the communication between a base station 24 and a mobile station 25 is shown. Particularly the downlink channel 26 from the base station 24 to the mobile station 25 includes the transmitter shown in FIG. 1, and the uplink channel 27 from the mobile station 25 to the base station 24 likewise includes the transmitter. The downlink channel 26 and the uplink channel 27 comprise different subchannels $D_1 \ldots D_N$, $D_1 \ldots D_N$. A first subset of the subchannels of the downlink channel 26 can for example be used for voice data and other subchannels can be used for the simultaneous transmission of video data. The data from the base station 24 are channelised (spread) with different spreading codes $C_{channel\ 1}, \ldots, C_{channel\ N}$, which are mutually orthogonal or bi-orthogonal 28, 30. The spread data are then scrambled 29, 31 with scrambling codes $C_{scramble\ 1}, \ldots, C_{scramble\ M}$. According to the present invention therefore scrambling codes which are different, but need not be mutually orthogonal or bi-orthogonal, are used within the same link, for example, the downlink 26. (The orthogonality requirements are satisfied by the spreading codes.)

For the uplink 27, according to the present invention either the same scrambling codes $C_{scramble\ 1}, \ldots, C_{scramble\ M}$ as in the case of the downlink 26, or another group of scrambling codes $C_{scramble\ 1}, \ldots, C_{scramble\ M}$ or, as generally the uplink channel 27 demands for the same high bit rate as the downlink channel 26, even just one scrambling code can be used.

As it has already been set forth above, the downlink channel 26 or the uplink channel 27 can comprise subchannels for video and/or voice transmission. As one aspect of the present invention, different scrambling codes can be allocated for the scrambling of the channels demanding for a high bit rate, as it is the case, for example, for the transmission of video data. For transmission of, for example, voice data, only one scrambling code can be used.

Regarding the details of the spreading and scrambling process, particularly the modulo-2 sum operation for the scrambling at the transmission side and the multiplying operation for the descrambling at the reception side, the above-cited documents WO 96/05668 A1 and EP-A-565 506 are incorporated by reference. Particularly FIGS. 1 and 2 in the corresponding description (page 14 to page 19) of WO 96/05668 A1 are incorporated by reference.

According to the present invention the spreading codes are generated by a code tree. This technique is known from Adachi, "Tree-structured generation of orthogonal spreading codes with different lengths for forward link of DS-CDMA mobile radio", Electronic Letters, January 1997, Vol. 33, No. 1, page 27, 28, which is incorporated herewith by reference.

Orthogonal spreading codes with different lengths can be generated by a tree-structure for orthogonal multiplexing of forward-link code-channels of different data rates in direct sequence code division multiple access DS-CDMA mobile radio. Thereby codes of the same layer of the tree constitute a set of Walsh functions and are orthogonal. Furthermore, any two codes of different layers of the tree structure are also orthogonal except for the case that one of the two codes is a mother code of the other.

As it has already been set forth in the introductory portion, when only one scrambling code (or long code) is used per link, there are restrictions of the combinations of codes which can be used for the orthogonal codes (see Adachi et al.) These restrictions may prevent a user from being allocated to a certain channel. These restrictions are especially important for high data rate users. Furthermore the highest data rate is restricted to the shortest orthogonal code.

As according to the present invention, two or more scrambling codes are assigned to one link (one user), the following advantages are achieved:

- increased flexibility in assignment of orthogonal codes since the data rate can be split over at least two scrambling codes and a different (longer) orthogonal code can be chosen from the code tree (see Adachi et al), and
- the highest data rate is increased since the data rate can be split over at least two scrambling codes. Therefore a higher data rate service on one link (uplink or downlink) can be provided by using a plurality of scrambling codes within one link. In this way the same channelisation codes (spreading codes) can be reused and a higher data rate can be supported because the highest data rate is restricted by the set of channelisation codes (spreading codes) with the shortest link.

By only using two scrambling codes (M=2) per link (user), the total number of available channelisation codes (spreading codes) can be doubled and the maximum data rate can also be doubled.

Figure 4:
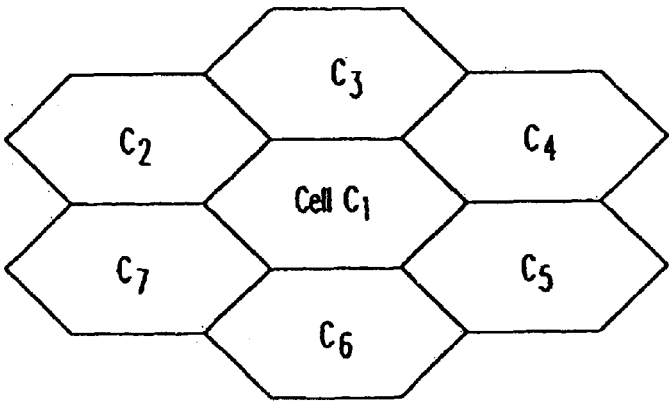
FIG. 4 shows the plurality of cells in the transmission system according to the present invention.

FIG. 4 shows a symbolized cell distribution of a wireless transmission system. One cell $C_1$ is surrounded by six other hexagonal cells $C_2, \ldots, C_7$. According to the present invention, a total number of, for example, 512 different scrambling codes can be used. To avoid interference between adjacent cells, the total number of 512 scrambling codes can for example be divided by 7 and each cell $C_1, \ldots, C_7$ can be allocated a subset of said scrambling codes. Different users within one cell can use different scrambling codes allocated to the respective cell.

As it has already been set forth above, according to the present invention one scrambling code is used in conjunction with a set of channelisation codes (spreading codes) depending upon the required data rate and services required. Adjacent base stations can use different scrambling codes and every base station uses a set of scrambling codes to maintain different links in each cell.

An application of the present invention will now be explained with reference to FIG. 5. According to the state of the art, if a new user requests, for example, a 2 Mbit/s service, the base station 24 is forced to allocate a new scrambling code (and code tree) to support this service. The codes in the code tree are therefore not optimally utilised.

To increase the flexibility of code assignment and increase the usage of the codes and the code tree, it is proposed to use as an option more than one scrambling code per link.

Figure 5:
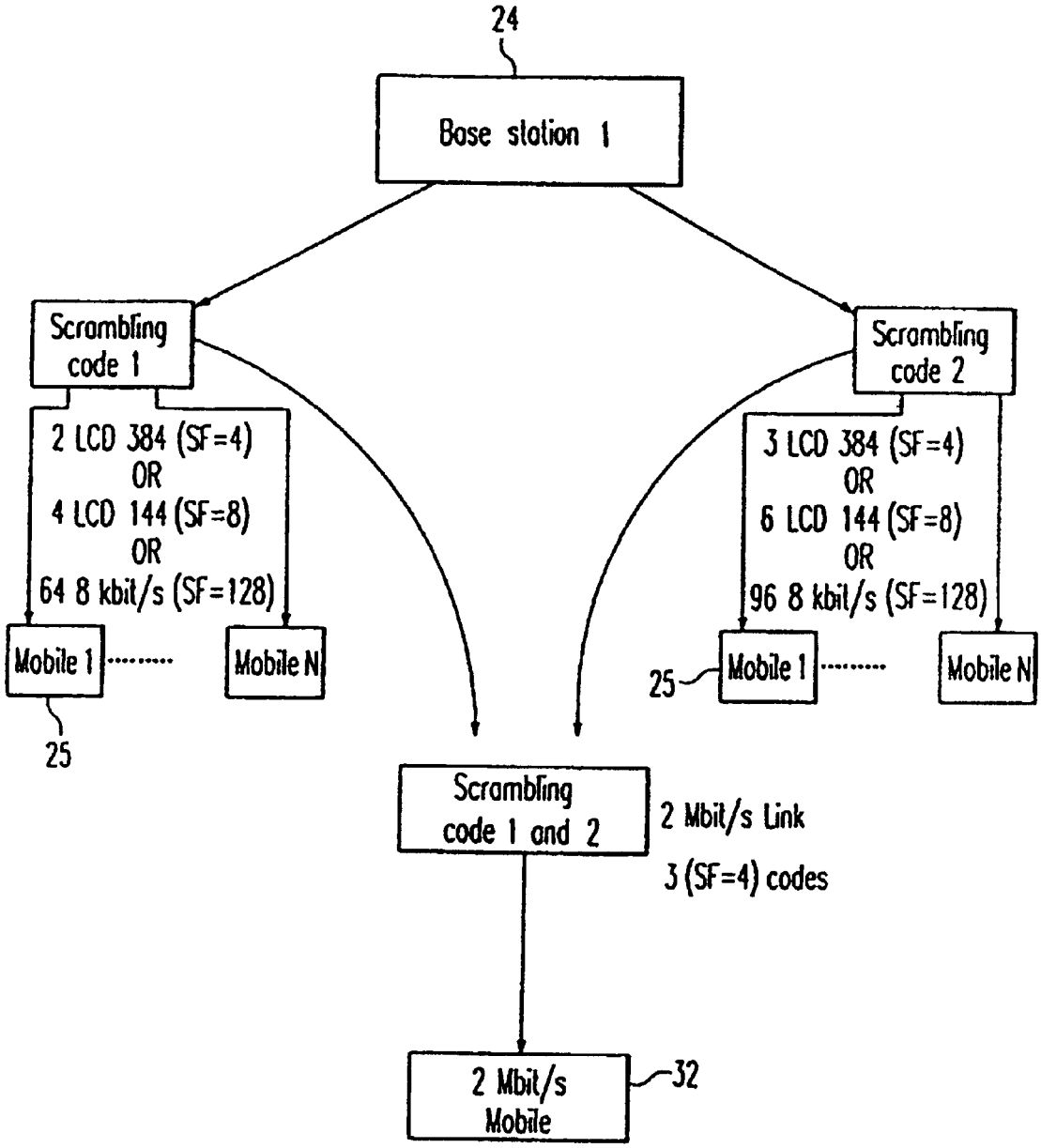
FIG. 5 shows an application of the present invention to provide for flexible code allocation in CDMA systems.

In FIG. 5 a base station 24 is shown using two scrambling sequences (codes) 1 and 2. Shown by each scrambling code is a set of possible services being supported by each of the scrambling codes. In this load situation, if a new user 32 requests a 2 Mbit/s service, the base station 24 has to devote a new scrambling code to support this service.

If, however, the new user 32 uses 2 (SF=4) orthogonal codes from scrambling code 1 and 1 (SF=4) orthogonal code from scrambling code 2, a 2 Mbit/s service can be supported and the codes and the code tree can be more optimally utilised.

Figure 6:
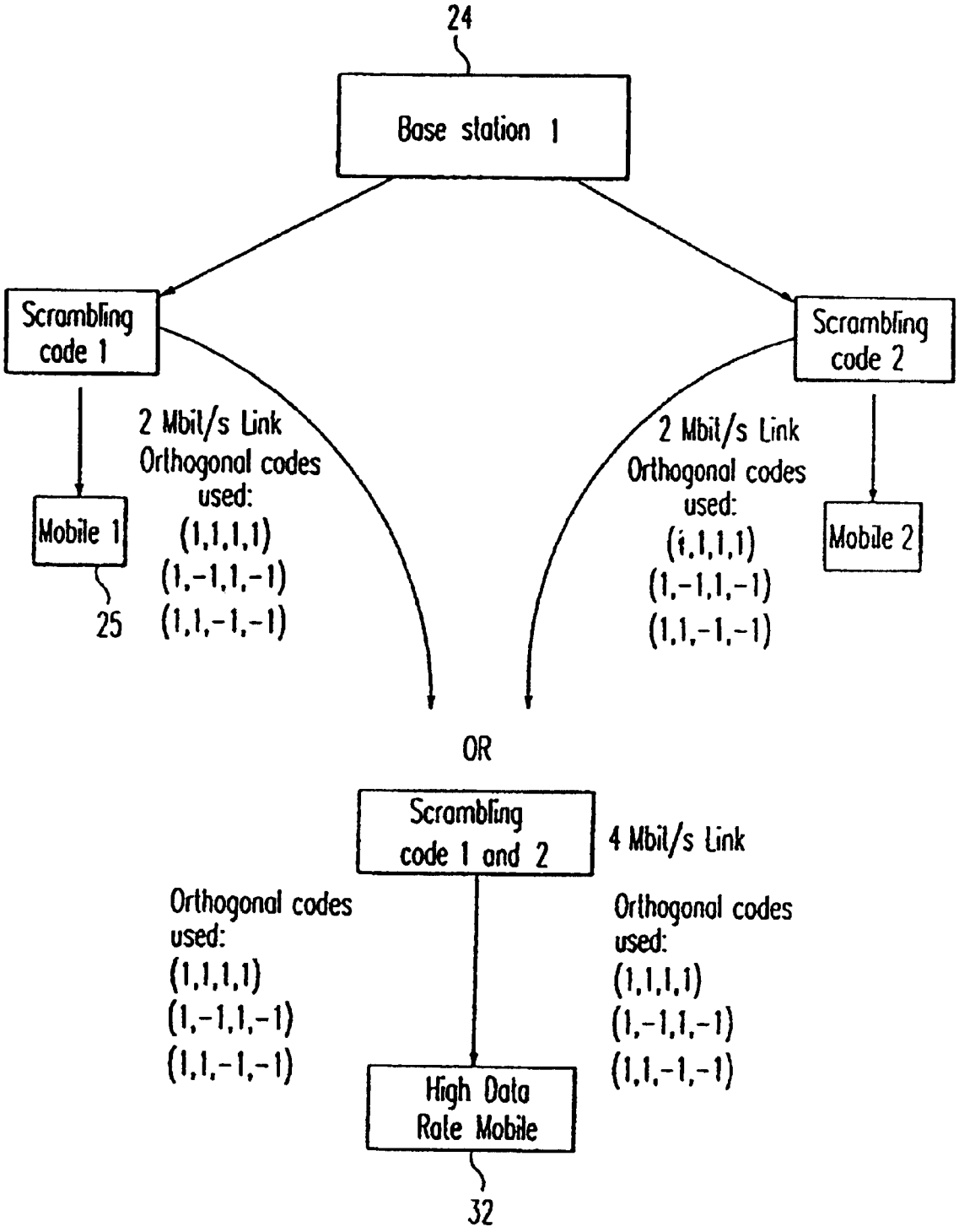
FIG. 6 shows an application of the present invention to provide for higher data rate services.

FIG. 6 shows another application of the present invention. According to FIG. 6 the idea according to the present invention is used to provide an increased data rate, for example, for a WCDMA system. FIG. 6 shows the suggested scheme for an increased data rate. To increase the data rate normally in WCDMA one or both of the following approaches are required:

reduction of processing gain, and increase of chip rate (enhanced bandwidth)

By utilizing the scheme as shown in FIG. 6 the data rate can be increased by combining more than one scrambling code. The example shows the data rate at 4 Mbit/s, but obviously higher rates can be achieved by using more than one scrambling code.

What is claimed is:

1. Transmitter for communicating data symbols over a communication channel, the transmitter comprising:

means for spreading each data symbol with a respective spreading code, wherein the spreading codes are mutually orthogonal, means for scrambling each spread symbol with a respective scrambling code, the scrambling codes respectively having the same length as the spreading codes, and means for transmitting said spread and scrambled symbols, wherein the means for scrambling are provided with a plurality of different scrambling codes which can be used simultaneously within the same link *so that a maximum data rate is increased*.

2. Transmitter according to claim 1,

[characterized in that] *wherein* the means for scrambling can use different scrambling codes for an uplink communication channel and a downlink communication channel, respectively.

3. Transmitter according claim 1,

[characterized in that] *wherein* the spreading codes are obtained by means of a code tree.

4. Transmitter according to claim 1,

[characterized in that] *wherein* only in a downlink communication channel different scrambling codes are used, wherein in an uplink channel only one scrambling code is used.

5. Transmitter according to claim 1,

[characterized in that] *wherein* the means for scrambling use different scrambling codes within the same link only for channels demanding a high bit rate.

6. Transmitter according to claim 5,

[characterized in that] *wherein* the means for scrambling use different scrambling codes within the same link only video channels.

7. Wireless transmission system, comprising:

means for spreading each data symbol with a respective spreading code, wherein the spreading codes are mutually orthogonal, means for scrambling each spread symbol with a respective scrambling code, the scrambling codes respectively having the same length as the spreading codes, and means for transmitting said spread and scrambled symbols, wherein the means for scrambling are provided with a plurality of different scrambling codes which can be used simultaneously within the same link *so that a maximum data rate is increased*, and wherein a subset of scrambling codes is respectively allocated to a cell of the transmission system.

8. Wireless transmission system according to claim 7,

[characterized in that] *wherein* different spreading codes are allocated to adjacent cells of the transmission system.

9. Method for the transmission of data symbols over a communication channel, comprising the following steps:

spreading each data symbol with a respective spreading code, wherein the spreading codes are mutually orthogonal, scrambling each spread symbol with a respective scrambling code, the scrambling codes respectively having the same length as the spreading codes, and transmitting said spread and scrambled symbols, wherein the scrambling step provides a plurality of different scrambling codes which can be used simultaneously within the same link *so that a maximum data rate is increased*.

10. Method according to claim 9,

[characterized in that] *wherein* in the step of scrambling different scrambling codes can be used for an uplink communication channel and a downlink communication channel, respectively.

11. Method according to claim 9,

[characterized in that] *wherein* the spreading codes are obtained by means of a code tree.

12. Method according to claim 9,

[characterized in that] *wherein* only in a downlink communication channel different scrambling codes are used, wherein in an uplink channel only one scrambling code is used.

13. Method according to claim 9,

[characterized in that] *wherein* different scrambling codes within the same link are used only for channels demanding a high bit rate.

14. Method according to claim 13,

[characterized in that] *wherein* different scrambling codes within the same link are used only for video channels.

*15. A method for the transmission of data symbols over a communication channel, comprising the following steps:*

*spreading each data symbol with a respective spreading code,*

*wherein the spreading codes are mutually orthogonal,*

*scrambling each spread symbol with a respective scrambling code, and*

*transmitting the spread and scrambled symbols,*

*wherein for the step of scrambling a plurality of different scrambling codes is provided so that a maximum data rate is increased.*

*16. The method according to claim 15,*

*wherein transmitting is over a downlink and 512 different scrambling codes are provided.*

*17. The method according to claim 16,*

*wherein the scrambling codes are divided in groups.*

*18. The method according to claim 17,*

*wherein each scrambling code group is allocated to a cell of a transmission.*

*19. The method according to claim 16,*

*wherein different user terminals in the same cell use different scrambling codes.*

*20. A wireless transmission system, comprising a plurality of user terminals in one cell and respectively connected with an uplink transmission to the same base station,*

*wherein each of the user terminals comprises:*

*means for spreading data symbols to be transmitted with a respective spreading code,*

*wherein the spreading codes are mutually orthogonal, and*

*means for scrambling each spread symbol with a respective scrambling code, and*

*wherein different user terminals in the same cell use different scrambling codes so that a maximum data rate is increased.*

*21. A transmitter for communicating data symbols over a communication channel comprising a plurality of sub-channels, the transmitter comprising:*

*means for spreading the data symbols of each sub-channel with a respective spreading code,*

*wherein the spreading codes are mutually orthogonal,*

*means for scrambling the spread symbols of each sub-channel with a scrambling code, and*

*means for the transmission of the spread and scrambled symbols of each sub-channel,*

*wherein said means for scrambling are designed to scramble different sub-channels with different scrambling codes so that a maximum data rate is increased.*

*22. Method for the transmission of data symbols over a communication channel comprising a plurality of sub-channels, comprising the following steps:*

*spreading the data symbols of each sub-channel with a respective spreading code,*

*wherein the spreading codes are mutually orthogonal,*

*scrambling the spread symbols of each sub-channel with a respective scrambling code,*

*wherein said sub-channels are scrambled with different scrambling codes so that a maximum data rate is increased, and*

*transmitting the spread and scrambled symbols of each sub-channel.*

* * * * *